United States Patent
Oh et al.

(10) Patent No.: US 7,327,984 B2
(45) Date of Patent: Feb. 5, 2008

(54) DEVICE AND METHOD FOR MEASURING RECEIVE SENSITIVITY OF COMMUNICATION SYSTEM INCLUDING RECEIVE-ONLY PATH

(75) Inventors: Young-Min Oh, Seongnam (KR);
Ki-Taek Jang, Anyang (KR);
Hyung-Sik Cho, Seongnam (KR);
Hyung-Sup Shin, Seoul (KR)

(73) Assignee: KTFREETEL Co., Ltd., Seoul (KR)

( * ) Notice: Subject to any disclaimer, the term of this patent is extended or adjusted under 35 U.S.C. 154(b) by 0 days.

(21) Appl. No.: 10/517,682

(22) PCT Filed: Mar. 12, 2004

(86) PCT No.: PCT/KR2004/000521

§ 371 (c)(1),
(2), (4) Date: Jul. 5, 2005

(87) PCT Pub. No.: WO2004/091124

PCT Pub. Date: Oct. 21, 2004

(65) Prior Publication Data

US 2005/0272377 A1 Dec. 8, 2005

(30) Foreign Application Priority Data

Apr. 10, 2003 (KR) .................. 10-2003-0022591

(51) Int. Cl.
*H04B 17/00* (2006.01)
(52) U.S. Cl. .............................. 455/67.11; 455/67.12; 455/67.13; 455/67.14; 455/115.1
(58) Field of Classification Search ................ 455/254, 455/423, 424, 67.11–67.14, 115.1–115.3
See application file for complete search history.

(56) References Cited

U.S. PATENT DOCUMENTS 5,548,820 A * 8/1996 Victorin .................. 455/67.14

(Continued)

FOREIGN PATENT DOCUMENTS

GB 2272604 A 5/1994

(Continued)

OTHER PUBLICATIONS

Steve Donovan, IMPS—Instant Messaging and Presence Using SIP, Fall VON Developers' Conference, Sep. 13, 2000.*

*Primary Examiner*—Nay Maung
*Assistant Examiner*—Fayyaz Alam
(74) *Attorney, Agent, or Firm*—Alston & Bird LLP

(57) ABSTRACT

Disclosed is a device (200) and a method for measuring a receive sensitivity of a communication system having a transmit and receive path and a receive-only path, like a base station (100) employing space diversity by means of one transmit and receive antenna (111) and an additional receive antenna (121). A terminal (220) is connected to the transmit and receive path and to the receive-only path by means of a first (112) and a second coupler (122) and a first (213a) and a second transmitter (215a) whereby the input signals are combined by a combiner (211) to a single signal fed to the terminal (220). Furthermore, the terminal (220) selectively transmits a test signal at selected frequencies to a receive sensitivity measuring path by means of a first (212) and a second (214) switch and a first (213b) and a second (215b) receiver in order to measure the receive sensitivities of the transmit and receive path and the receive-only path of the communication system and to measure the performance of the corresponding communication system.

10 Claims, 2 Drawing Sheets

U.S. PATENT DOCUMENTS

| | | | | |
|---|---|---|---|---|
| 5,572,510 A * | 11/1996 | Koivu | | 370/252 |
| 5,678,208 A * | 10/1997 | Kowalewski et al. | | 455/115.1 |
| 5,752,165 A * | 5/1998 | Hokkanen | | 455/67.11 |
| 5,831,974 A * | 11/1998 | Suonvieri | | 370/252 |
| 5,909,641 A * | 6/1999 | Simmons | | 455/78 |
| 5,978,659 A * | 11/1999 | Kim | | 455/67.11 |
| 5,978,675 A * | 11/1999 | Niemela | | 455/423 |
| 6,005,891 A * | 12/1999 | Chadwick et al. | | 375/224 |
| 6,011,962 A * | 1/2000 | Lindenmeier et al. | | 455/226.1 |
| 6,011,972 A * | 1/2000 | Kim | | 455/446 |
| 6,122,505 A * | 9/2000 | Genell et al. | | 455/423 |
| 6,175,555 B1 * | 1/2001 | Hoole | | 370/280 |
| 6,308,065 B1 * | 10/2001 | Molinari et al. | | 455/424 |
| 6,313,644 B1 * | 11/2001 | Kim et al. | | 324/645 |
| 6,505,041 B1 * | 1/2003 | Borgstrand | | 455/423 |
| 6,724,730 B1 * | 4/2004 | Mlinarsky et al. | | 370/241 |
| 6,748,196 B2 * | 6/2004 | Lee et al. | | 455/69 |
| 6,898,185 B1 * | 5/2005 | Agazzi et al. | | 370/241 |
| 6,963,738 B1 * | 11/2005 | Fontaine | | 455/405 |
| 6,990,358 B2 * | 1/2006 | Seki | | 455/560 |
| 2002/0154604 A1 * | 10/2002 | Huhtala | | 370/241 |
| 2003/0179730 A1 | 9/2003 | Lee et al. | | |
| 2004/0121733 A1 * | 6/2004 | Peng | | 455/66.1 |
| 2005/0032494 A1 * | 2/2005 | Swant | | 455/226.1 |
| 2005/0075077 A1 * | 4/2005 | Mach et al. | | 455/67.13 |
| 2005/0148302 A1 * | 7/2005 | Huhtala | | 455/67.11 |
| 2005/0272395 A1 * | 12/2005 | Sorells et al. | | 455/319 |

FOREIGN PATENT DOCUMENTS

| | | |
|---|---|---|
| KR | 1020010046046 A | 6/2001 |
| KR | 2002068965 A | 8/2002 |
| WO | WO 01/26239 A1 | 4/2001 |

* cited by examiner

DEVICE AND METHOD FOR MEASURING RECEIVE SENSITIVITY OF COMMUNICATION SYSTEM INCLUDING RECEIVE-ONLY PATH

TECHNICAL FIELD

The present invention relates to a device and method for measuring a receive sensitivity of a communication system including a receive only path. More specifically, the present invention relates to a device and method for measuring a receive sensitivity of a communication system including a receive-only path for conveniently measuring a receive sensitivity of a receive-only path of a communication system including a transmit and receive path and a receive-only path.

BACKGROUND ART

In a communication system including a transmit and receive path and a receive-only path, methods for measuring receive sensitivities of the respective paths have been developed in order to measure performance of the paths.

It is relatively easy to measure the receive sensitivity of the transmit and receive path while the communication system provides services, since the transmit and receive path can communicate with a device for measuring the receive sensitivities.

However, since the receive-only path has no transmission function, it is not easy to measure the receive sensitivity of the receive-only path while the communication system provides services, and it is not easy to measure the receive sensitivity thereof when the communication system provides no services.

An exemplified communication system having a general transmit and receive path and a receive-only path is a mobile communication base station which manages three or less FAs (Frequency Assignments).

The mobile communication base station has two paths A and B as a default, and the path A services 3FA, 5FA, and 7FA, and the path B services 1FA, 2FA, 4FA, and 6FA in the general manner. Therefore, the paths A and B have the transmission and receiving functions when they service three or more FAs. However, in the case of servicing three or less FAs, the path A manages transmission and receiving of three FAs, and the path B includes a receive-only path for diversity of the path A.

FIG. 1 shows a block diagram for measuring the receive sensitivity of the transmit and receive path.

Referring to FIG. 1, the base station 100 comprises a transmit and receive antenna 111 for transmitting and receiving 1FA, 2FA, and 3FA at the path A 110, a duplexer 113, an HPA (High Power Amplifier) 114, and a first LNA (Low Noise Amplifier) 115. In addition, a first coupler 112 for measuring the sensitivity is coupled to the transmit and receive antenna 111.

The path B 120 for a diversity path comprises a receive antenna 121, a second coupler 122, a filter 123, and a second LNA 124.

The transmit and receive antenna 111 of the path A 110 transmits and receives data through three frequencies of 1FA, 2FA, and 3FA to thus form a transmit and receive path. In this instance, the duplexer 113 couples the HPA 114 to the transmit and receive antenna 111 at the time of transmission, and couples the transmit and receive antenna 111 to the first LNA 115, thereby modifying the data path according to transmission and reception.

The first coupler 112 is previously combined with the transmit and receive antenna 111 so as to test the performance of the transmit and receive path, and extracts signals transmitted to and received from the path A 110 of the base station 100 according to the coupling effect so as to calculate the measured receive sensitivity.

The path B 120 is a receive-only path for the diversity path of the transmit and receive antenna 111 of the path A 110, and it transmits the data received at the receive-only antenna 121 to the second LNA 124 through the filter 123, and the receive-only antenna 121 includes a second coupler 122.

In order to measure the receive sensitivity of the path A 110 which is a transmit and receive path and the path B 120 which is a transmit-only path, a receive sensitivity jg 130 coupled to EQP (Equivalence Point Titration) ports of the first and second couplers 112 and 122 is provided In order to process the receive sensitivity of the path A 110 of the base station 100 in the above configuration, the receive sensitivity jg 130 coupled to the EQP port of the first coupler 112 establishes a lowest signal level which can be received when the base station 100 is normally operated through data transmission and reception with the path A, and transmits the established lowest level signal to the base station 100.

When normally receiving the lowest level signal transmitted by the receive sensitivity jg 130, the path A 110 of the base station 100 can measure errors of the path of from the receive sensitivity jg 130 to the initial receive terminal of the path A, and the receive sensitivity using the lowest level signal transmitted by the receive sensitivity jg 130.

However, since the path B 120 is a receive-only path as described above, communication with the receive sensitivity jg 130 is impossible, and it is also impossible to establish the lowest level signal. Accordingly, it is difficult to measure the receive sensitivity of the path B 120, and the service may be interrupted during a measuring process.

DISCLOSURE OF INVENTION

Technical Problem

It is an advantage of the present invention to provide a receive sensitivity measuring device and method of a communication system including a receive-only path for easily measuring the receive sensitivity of a receive-only path when a general service is provided, in order to measure performance of a communication system including a receive-only path.

Technical Solution

In one aspect of the present invention, in a receive sensitivity measuring device including a terminal for transmitting a test signal through communication with a receive sensitivity measuring path so as to measure the receive sensitivity of a communication system including a transmit and receive path and a receive-only path, a receive sensitivity measuring device including a receive-only path comprises:

a first transmitter for receiving a signal from the transmit and receive path, and transmitting the signal to the terminal;

a second transmitter for receiving a signal from the receive-only path, and transmitting the signal to the terminal;

a first receiver for receiving a test signal from the terminal, and transmitting the test signal to the transmit and receive path;

a second receiver for receiving a test signal from the terminal, and transmitting the test signal to the receive-only path;

a signal selector, for selecting one of the first and second receivers connected to the signal selector and a receive sensitivity measuring path so that one of the first and second receivers may be selectively connected to the terminal; and a combiner, connected to the first and second transmitters and the first and second receivers, for combining a plurality of input signals into a single signal, and transmitting the single signal to the terminal, wherein the terminal transmits the test signal to the receive sensitivity measuring path so that the corresponding receive sensitivity measuring path may measure a cable loss to the terminal and the receive sensitivity generated by using the test signal transmitted by the terminal.

The terminal establishes a test signal and transmits the test signal to the receive sensitivity measuring path through a communication with the receive sensitivity measuring path.

The terminal transmits the lowest receive level signal to the receive sensitivity measuring path, the lowest receive level signal being acceptable to the receive sensitivity measuring path.

The receive sensitivity measuring device further comprises a coupler installed in an antenna coupled to the transmit and receive path and the receive-only path so as to communicate signals with the first and second transmitters, the first and second receivers, and the receive sensitivity measuring path.

In order to measure the receive-only path, the terminal communicates with the receive-only path through the first transmitter coupled to the transmit and receive path and the second receiver coupled to the receive-only path.

The terminal is established with a plurality of frequencies, and is allowed to transmit the test signal.

The signal selector is a switch for performing a switching operation according to a user selection.

In another aspect of the present invention, in a receive sensitivity measuring method using a measuring device coupled to a communication system including a transmit and receive path and a receive-only path, the measuring device including a terminal for outputting a test signal to a receive sensitivity measuring path through a communication with the receive sensitivity measuring path from among the transmit and receive path and the receive-only path, a receiving sensitivity measuring method of a communication system including a receive-only path comprises:

(a) the receive sensitivity measuring path receiving the test signal from the terminal;

(b) calculating a cable loss between the receive sensitivity measuring path and the terminal; and (c) allowing the receive sensitivity measuring path to use the test signal level transmitted by the terminal in (a) and the cable loss measured in (b) to measure a receive sensitivity of the receive sensitivity measuring path, and determine normal states.

When the receive sensitivity measuring path in (a) is a receive-only path, the terminal uses a transmission function of the transmit and receive path and a receiving function of the receive-only path, and establishes test signals to be transmitted to the receive-only path.

The test signal transmitted by the terminal is the lowest receive level signal to be received by the corresponding receive sensitivity measuring path.

ADVANTAGEOUS EFFECTS

Description of Drawings

The accompanying drawings, which are incorporated in and constitute a part of the specification, illustrate an embodiment of the invention, and, together with the description, serve to explain the principles of the invention.

BEST MODE

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
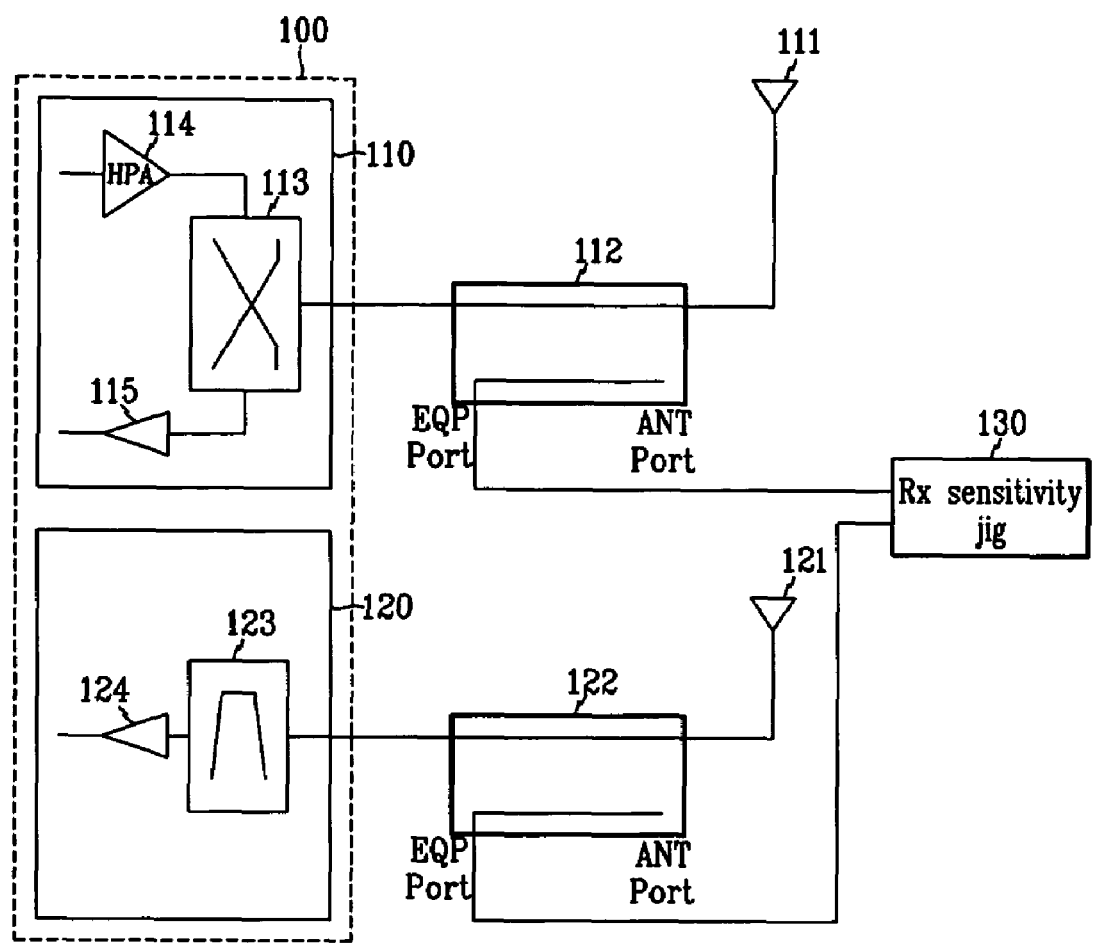
FIG. 1 shows a block diagram for measuring the receive sensitivity of the transmit and receive path.
Figure 2:
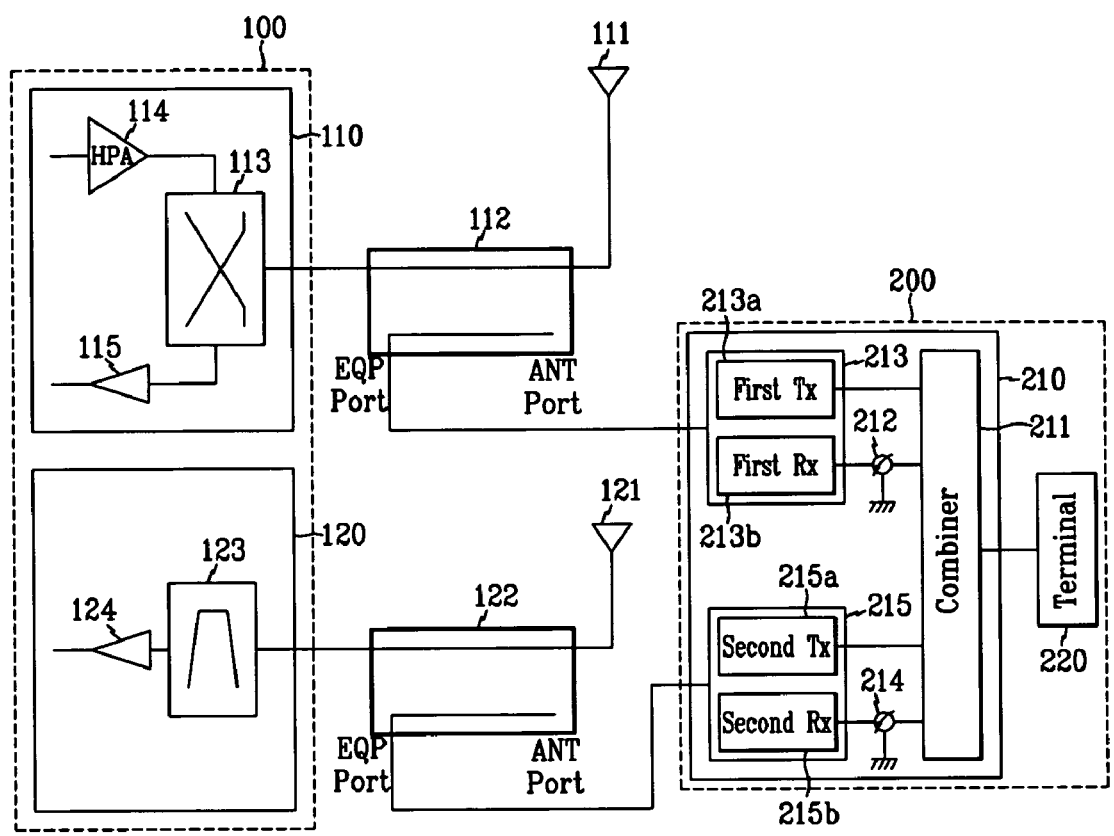
FIG. 2 shows a block diagram of a receive sensitivity measuring device of a communication system including a receive-only path according to a preferred embodiment of the present invention.

FIG. 2 shows a block diagram of a receive sensitivity measuring device of a communication system including a receive-only path according to a preferred embodiment of the present invention.

Referring to FIG. 2, a base station 100 for managing three or less FAs has the same configuration as that of the prior art, and comprises a receive sensitivity measuring device 200 coupled to an EQP port of the first coupler 112 and an EQP port of the second coupler 122 so as to measure the receive sensitivity of one of the paths A and B 110 and 120.

The receive sensitivity measuring device 200 comprises a switch 210 and a terminal 220, and the switch 210 comprises a combiner 211, a first switch 212, a first transmitter and receiver 213, a second switch 214, and a second transmitter and receiver 215.

The terminal 220 communicates with the respective paths A and B of the base station 100, establishes signals with the lowest level power which can be received by the paths, and transmits them in order to measure the receive sensitivity of one of the paths A and B.

The first transmitter and receiver 213 of the switch 210 comprises a first transmitter 213a being coupled to the EQP port of the first coupler 112 of the transmit and receive antenna 111, that receives, by coupling, signals transmitted through the path A 110; and a first receiver 213b that receives signals from the terminal and transmits the signals to the transmit and receive antenna 111.

The second transmitter and receiver 215 of the switch 210 comprises a second transmitter 215a being coupled to the EQP port of the second coupler 122 of the receive antenna 121, that receives, by coupling, signals transmitted through the path B 120; and a second receiver 215b that receives signals from the terminal and transmits the signals to the receive antenna 121.

The first switch 212 is coupled between the first receiver 213b and the combiner 211, and it is turned on when measuring the receive sensitivity of the path A 110, and turned off when measuring the receive sensitivity of the path B 120.

The second switch 214 is coupled between the second receiver 215b and the combiner 211, and it is turned on when measuring the receive sensitivity of the path B 120, and turn off when measuring the receive sensitivity of the path A 110.

The combiner 211 combines the signals transmitted and received by the first and second transmitters and outputs the combined signals to the terminal through a single line.

Without being restricted to the above description, the first and second receivers 213b and 215b can be coupled to a multiplexer, and the signals can be selectively output to the combiner 211 rather than using the switch.

An operation of the preferred embodiment will now be described.

The first switch 212 of the receive sensitivity measuring device 200 is turned on, and the second switch 214 thereof is turned off so as to measure the receive sensitivity of the path A 110.

When the path A 110 is found to be normal through a communication with the path A by the terminal 220, the terminal 220 establishes the lowest level signal for receiving signals, and transmits the lowest level signal to the path A.

The path A receives the lowest level signal from the terminal 220, and determines normal receiving states. The base station 100 normally receives the lowest level signal, uses cable loss of from a final end of the path A 110 for transmitting and receiving signals to the receive sensitivity measuring device 200, and the lowest level intensity of the received signal, and calculates a receive sensitivity for the lowest reception.

Measuring the receive sensitivity of the path B 120 is performed as follows.

The path B 120 cannot communicate with the terminal 220 since the path B 120 has no transmission function, and hence, the terminal 220 cannot establish the lowest level receive signal of the path B 120.

Accordingly, the receive sensitivity measuring device 200 uses the transmission function of the path A to establish the lowest level signal of the path B. That is, the terminal 220 can use the first transmitter 213a coupled to the transmit signals of the path A 110 to communicate through the second receiver 215b coupled to the receive signal of the path B 120 so as to establish the lowest level signal of the path B.

When the terminal 220 transmits the signals with the lowest level signal, the path B 120 uses the loss of the cable and the lowest level signal transmitted by the terminal 220 to calculate the receive sensitivity in the case the path B normally receives the signals.

To calculate the receive sensitivity in the above-described preferred embodiment, the terminal 220 transmits the lowest level signal through the communication with one of the paths A and B for measuring the receive sensitivity, and one of the paths A and B uses the lowest level signal transmitted by the terminal 220, the loss of from the terminal 200 to one of the first and second couplers 112 and 122, a measured cable loss to the base station, and an AFEU (Antenna Front End Unit) coupling value of the base station, and calculates an output value of the terminal 220.

Since the receive sensitivity measuring device 200 can transmit signals through the terminal 220, unnecessary data may be transmitted from the terminal, and the performance of the communication system may be degraded if the receive sensitivity is not measured. To prevent this, the receive sensitivity measuring device 200 is maintained at the turned-off state before measuring the receive sensitivity.

Also, it is needed to turn off the receive sensitivity measuring device 200 after measuring the receive sensitivity, and to ensure it is turned off, a timer function is required to be installed in the receive sensitivity measuring device 200 so that it may be automatically turned off after a predetermined time, thereby preventing degradation of performance of the communication system caused by transmission of unnecessary signals when no measuring process is executed.

Further, the automatic power off function can be reinforced by adding a circuit for monitoring the power states to the receive sensitivity measuring device 200.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

For example, the receive sensitivity measuring device 200 can be coupled to a path for measuring the receive sensitivity to thus control transmission and reception, and accordingly, the receive sensitivity of the path can be easily measured without service interruption while providing general services.

Also, the method for measuring the receive sensitivities of the two paths at the base station having a transmit and receive path and a receive-only path has been described, and without being restricted to the base station, the receive sensitivity of the communication system can be measured through a switching operation, by turning on the switch coupled to each path for measuring the receive sensitivity of the communication system having a transmit and receive path and a receive-only path.

As described, in the device and method for measuring the receive sensitivities of the communication system including a receive-only path, a measuring device is directly connected to the antennas installed in the communication system having a transmit and receive path and a receive-only path, it is allowed to measure the receive sensitivity during general services, and accordingly, it is easy to determine whether the communication system operates normally.

In addition, the lowest level signal can be established through a communication with a terminal of the measuring device via the transmit and receive path in the case of no transmission function such as in the receive-only path, thereby allowing easy measuring of the receive sensitivity of the communication system.

The invention claimed is:

1. A receive sensitivity measuring device including a terminal for transmitting a test signal through a receive sensitivity measuring path so as to measure the receive sensitivity of a communication system including (1) a transmit-and-receive path operatively connected to both a base station transmitter and a base station primary receiver, and (2) a receive-only path connected to a base station diversity receiver, a the receive sensitivity measuring device coupled to the receive-only path and the transmit-and-receive path, the receive sensitivity measuring device comprising:

a first transmitter (213a) for receiving a first signal from the transmit-and-receive path, and transmitting the first signal to the terminal;

a second transmitter (215a) for receiving a second signal from the receive-only path, and transmitting the second signal to the terminal;

a first receiver (213a) for receiving the test signal from the terminal, and transmitting the test signal to the transmit-and-receive path;

a second receiver (215b) for receiving the test signal from the terminal, and transmitting the test signal to the receive-only path;

a signal selector (212 or 214), for selecting one of the first or second receivers connected to the signal selector and the receive sensitivity measuring path so that one of the first or second receivers is selectively connected to the terminal; and a combiner (211), connected to the first and second transmitters (213*a* and 215*a*) and the first and second receivers (213*b*, 215*b*), for combining the first signal and the second signal into a single signal, and transmitting the single signal to the terminal, wherein the terminal transmits the test signal to the receive sensitivity measuring path so that the corresponding receive sensitivity measuring path measures a cable loss to the terminal and the receive sensitivity generated by using the test signal transmitted by the terminal.

2. The receive sensitivity measuring device of claim 1, wherein the terminal establishes the test signal and transmits the test signal to the receive sensitivity measuring path through a communication with the receive sensitivity measuring path.

3. The receive sensitivity measuring device of claim 1, wherein the terminal transmits a lowest receive level signal to the receive sensitivity measuring path, the lowest receive level signal being acceptable to the receive sensitivity measuring path.

4. The receive sensitivity measuring device of claim 1, wherein the terminal is attachable to and removable from the receive sensitivity measuring device.

5. The receive sensitivity measuring device of claim 1, further comprising a first coupler installed in a first antenna coupled to the transmit-and-receive path and a second coupler installed in a second antenna coupled to the receive-only path so as to communicate signals with the first and second transmitters, the first and second receivers, and the receive sensitivity measuring path.

6. The receive sensitivity measuring device of claim 1, wherein, in order to measure the receive-only path, the terminal communicates with the receive-only path through the first transmitter coupled to the transmit-and-receive path and the second receiver coupled to the receive-only path.

7. The receive sensitivity measuring device of claim 1, wherein the terminal is capable of transmitting the test signal on one of a plurality of frequencies.

8. The receive sensitivity measuring device of claim 1, wherein the signal selector is a switch for performing a switching operation according to a user selection.

9. The receive sensitivity measuring device of claim 1, further comprising a timer for automatically turning off the receive sensitivity measuring device when the terminal transmits the test signal and a predetermined time has passed.

10. The receive sensitivity measuring device of claim 6 wherein in order to measure the receive-only path, the terminal establishes the test signal using the first signal, which is transmitted by the base station transmitter through the transmit-and-receive path, provided from the first receiver and the second signal, which is received by the base station diversity receiver through the receive-only path, provided from the second receiver, and transmits the test signal to the receive-only path.

* * * * *